United States Patent [19]
Bell et al.

[11] 4,035,993
[45] July 19, 1977

[54] SEED HARVESTER

[75] Inventors: Rex D. Bell; Robert R. Favor, both of Bowie, Tex.

[73] Assignee: Bowie Industries, Inc., Bowie, Tex.

[21] Appl. No.: 659,008

[22] Filed: Feb. 18, 1976

[51] Int. Cl.² .......................................... A01D 45/30
[52] U.S. Cl. ........................................ 56/13.1; 56/16.5; 56/126; 209/283
[58] Field of Search ........................ 56/13.1–13.3, 56/12.9, 16.5, 126–130, 328 R, 330; 130/22 A; 209/283

[56] References Cited
U.S. PATENT DOCUMENTS

| | | | |
|---|---|---|---|
| 1,369,376 | 2/1921 | Bartels | 56/12.9 |
| 1,844,750 | 2/1932 | Ellis | 56/13.1 |
| 2,046,932 | 7/1936 | Wyatt et al. | 56/13.2 |
| 2,593,625 | 4/1952 | Stokes | 56/13.1 X |
| 2,673,436 | 3/1954 | Urban | 56/13.1 |
| 3,193,995 | 7/1965 | Miller | 56/12.9 |
| 3,404,517 | 10/1968 | Whitfield et al. | 56/16.5 X |

Primary Examiner—Jay N. Eskovitz
Attorney, Agent, or Firm—Wayland D. Keith

[57] ABSTRACT

Vacuum device moves seeds and debris from an orchard floor to a troughed screen where flexible rotating fingers vibrate screen which separates the seeds from the debris and rotating rigid fingers move debris to a point of discharge. An auger may also be provided beneath the screen for moving separated seeds and fines to a cleaner for removing fine particles from the separated seeds, if desired.

9 Claims, 12 Drawing Figures

SEED HARVESTER

BACKGROUND OF THE INVENTION

The background of the invention will be set forth in two parts.

FIELD OF THE INVENTION

The present invention pertains generally to the field of seed harvesters and more particularly to a new and useful seed harvester for moving seeds and debris from an orchard floor to a separator which separates the seeds from the debris.

DESCRIPTION OF THE PRIOR ART

Paper mills and other large users of evergreen trees plant them in orchards and harvest seeds from the trees. These seeds are in pine cones which will break open and scatter the seeds on the orchard floor within about a month from the time the seeds mature.

The only prior art practice known to applicants dictates that these cones be harvested from the trees manually before the cones break open. An orchard may have one hundred acres or more of trees. However, only about eleven or twelve acres may be harvested by hand in the limited time available.

The harvested cones are taken to sheds where they are permitted to crack open and dispell their seeds. Screening techniques are then employed to recover the seeds.

SUMMARY OF THE INVENTION

In view of the foregoing factors and conditions characteristic of pine cone seed harvesting, it is a primary object of the present invention to provide a new and useful device for harvesting such seeds efficiently and expeditiously.

It is another object of the present invention to provide a device of the type described which will move seeds and debris from an orchard floor to a separator which separates the seeds from the debris.

According to the present invention, an apparatus is provided for harvesting seeds mixed with debris on an orchard floor. This apparatus may include a separator, a device for moving the seeds and debris from the orchard floor to the separator and suitable mechanism in the separator for separating the debris from the seeds.

This harvesting apparatus may include a self-propelled vehicle which carries all of the machinery required for collecting the seeds and debris from the orchard floor, separating the seeds from the debris, discharging the debris and cleaning the separated seeds.

According to another aspect of the present invention, a self-powered seed harvester is provided for harvesting seeds mixed with debris on an orchard floor. The harvester comprises a vehicle having means for propelling it along the orchard floor, a separator for separating the seeds from the debris and a seed-debris gathering device mounted on the vehicle, in communication with the orchard floor and the separator, for moving the seeds and debris from the orchard floor to the separator.

The separator may include a chamber having an encompassing side wall, a closed top and an open bottom. A screen may be mounted in the open bottom for receiving the debris and seeds and a debris discharge opening may be provided in the side wall of the chamber. The separator may also include a plurality of kicker fingers rotatably mounted in the chamber above the screen for vibrating the screen to cause the seeds to pass through the screen and for moving the debris toward the debris discharge opening.

The seed-debris gathering device may include a vacuum chamber having an outlet communicating with the separator chamber. This vacuum chamber may have an inlet. The seed-debris gathering device also includes a pick-up head carried by the vehicle closely adjacent the orchard floor, a conduit connecting the pick-up head to the vacuum-chamber inlet, a flexible seal rotatably mounted in the vacuum-chamber outlet for maintaining an air seal while permitting movement of the seeds and debris through the vacuum chamber outlet to the screen in the separator chamber and a fan rotatably mounted on the vehicle in fluid communication with the vacuum chamber for creating at least a partial vacuum in the vacuum chamber.

The fan may include an air outlet and a conduit may connect this air outlet to the separator for discharging air under the screen to lift the debris above the screen.

Additionally, an auger may be mounted on the vehicle beneath the screen for collecting seeds dropping through the screen and moving them to the seed outlet where an elevator will move the separated seeds to a seed cleaner which may be mounted on the vehicle for cleaning the separated seeds.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENT

Figure 1:
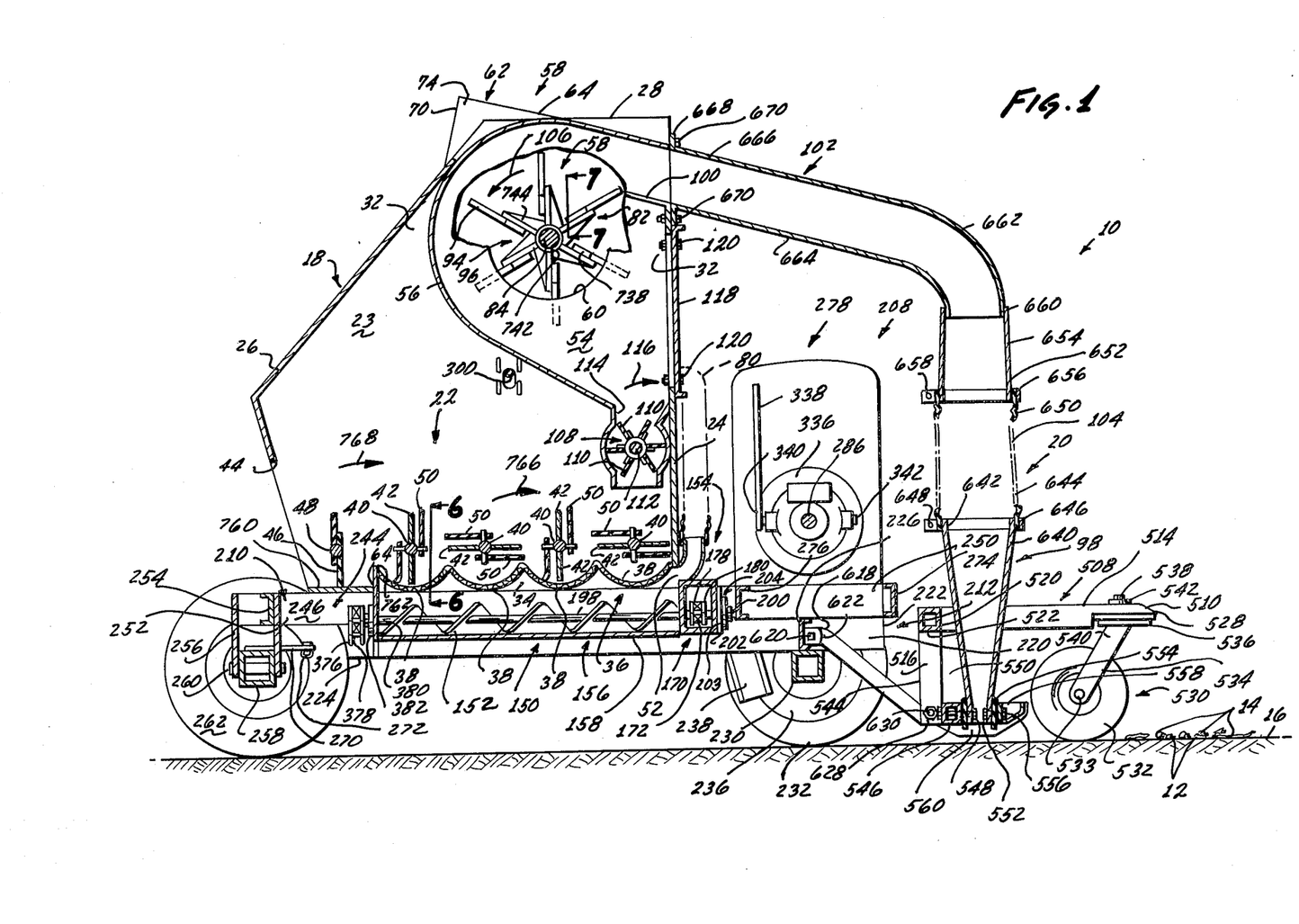
FIG. 1 is a right side-sectional view of a seed harvester constituting a presently-preferred embodiment of the invention.

Referring again to the drawings, and more particularly to FIG. 1, a seed harvester constituting a presently-preferred embodiment of the invention, generally designated 10, is adapted to harvest seeds 12 mixed with debris 14 on an orchard floor 16 and includes a separator 18 for separating seeds 12 from debris 14, a device 20 for moving seeds 12 and debris 14 from orchard floor 16 to separator 18 and suitable apparatus, generally designated 22, in separator 18 for separating debris 14 from seeds 12.

Figure 2:
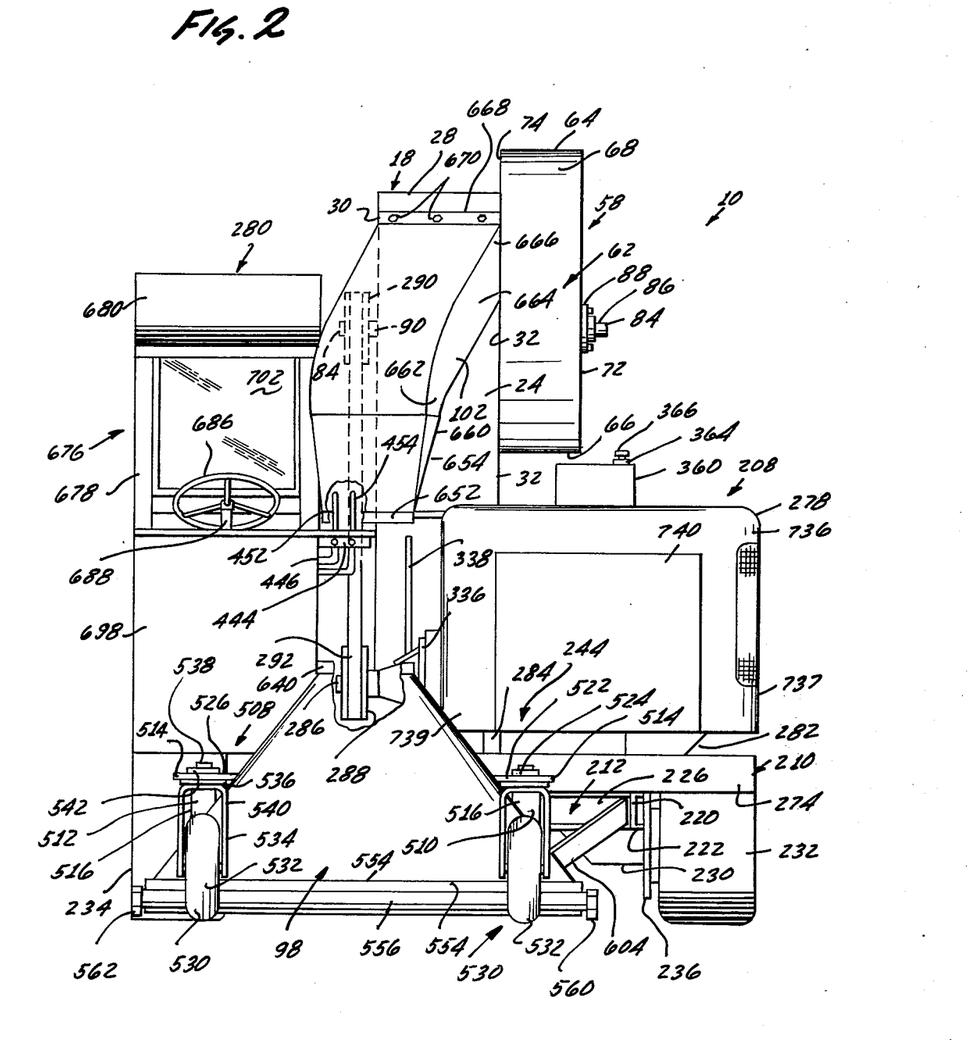
FIG. 2 is a front elevational view, with parts broken away to show internal construction, of the seed harvester.
Figure 3:
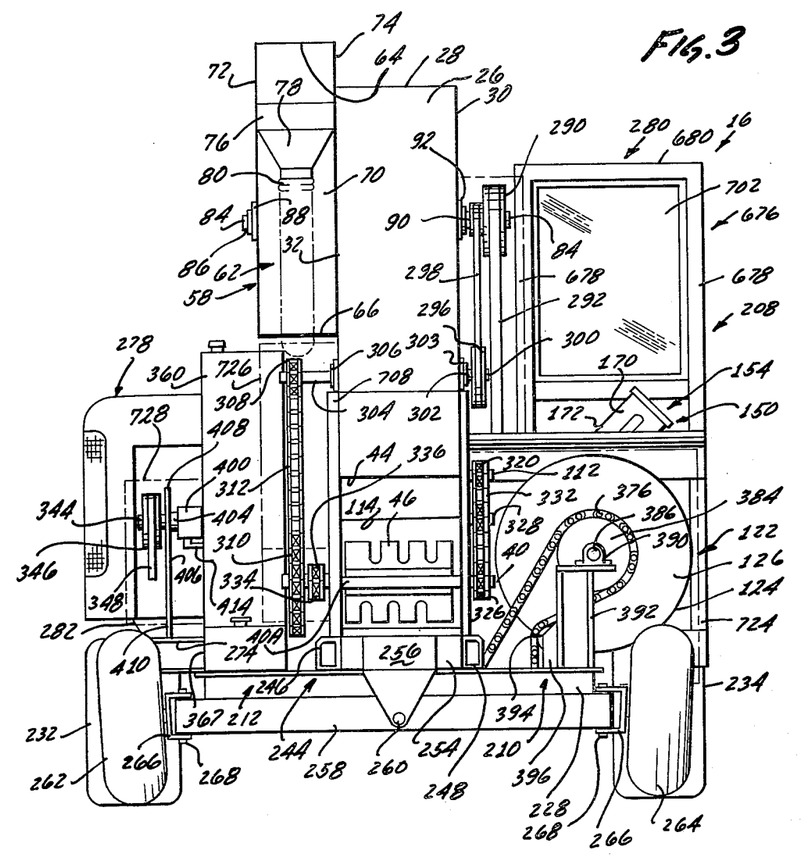
FIG. 3 is a rear elevational view of the harvester.
Figure 6:
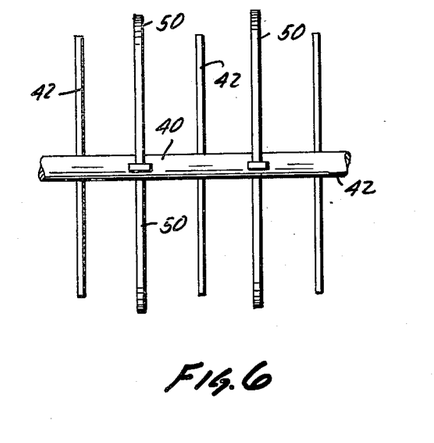
FIG. 6 is a cross-sectional view taken along line 6—6 of FIG. 1.

Referring now to FIGS. 1, 2 and 3, separator 18 defines a chamber 23 formed by a front wall 24, a rear wall 26, a top wall 28, a right side wall 30 and a left side wall 32. Separator 18 includes an open bottom 34 across which the separator apparatus 22 is mounted. This apparatus includes a suitable screen, shown herein for purposes of illustration, but not of limitation, as comprising a sine-wave screen 36, having a plurality of troughs 38 above each of which a kicker shaft 40 is rotatably mounted. Each kicker shaft 40 carries a plurality of rigid kicker fingers 42 mounted on suitable centers, such as three inches, and at an angle, as shown in FIG. 6. Fingers 42 may be made from steel or the like and sweep screen 36 to move debris 14 toward a debris-outlet 44 provided in rear wall 26. Debris 14 is discharged through outlet 44 by an impeller 46 rotatably mounted in chamber 23 adjacent outlet 44 on an impeller shaft 48. Impeller 46 may be made from rubber or a suitable polymeric material and has the configuration shown in elevation in FIG. 3.

Each kicker shaft 40 also carries a plurality of flexible kicker fingers 50 which may be made from rubber or a suitable polymeric material. Fingers 50 may also be placed on suitable centers, such as three inches, for example, and are of sufficient length to strike screen 36 causing it to vibrate encouraging seeds 12 to drop through screen 36 while fingers 50 sweep light debris out of troughs 38. Apparatus 22 also includes an air inlet 52 through which air may be supplied to chamber 23 beneath screen 36 for lifting debris 14 from screen 36.

The device 20, which moves seeds 12 and debris 14 from orchard floor 16 to separator 18, is shown herein for purposes of illustration, but not of limitation, as comprising a vacuum-operated system. This system includes a vacuum chamber 54 formed in separator 18 by front wall 24, top wall 28, side walls 30, 32 and an arcuate partition 56. Device 20 also includes a fan assembly 58 communicating with vacuum chamber 54 through an opening 60 provided in separator side wall 32. Fan assembly 58 includes a housing 62 having a top wall 64, a bottom wall 66, a front wall 68, a rear wall 70 and a left side wall 72. The left side wall 32 of separator 18 forms the lower portion of the right side wall of fan housing 62 with the upper portion 74 thereof being formed by an extension of wall 32. An air outlet 76 (FIG. 3) is provided in rear wall 70; an air scoop 78 is affixed to rear wall 70 adjacent this opening for supplying air to air inlet 52 in separator 18 through a conduit 80.

Fan assembly 58 also includes an impeller 82 rotatably mounted in housing 62 on a shaft 84 having its left end 86 journaled in fan side wall 72 by a bearing assembly 88 and its right end 90 journaled in separator side wall 30 by bearing assembly 92. Impeller 82 includes a plurality of blades 94 (FIGS. 1 and 7) which may be made from a suitable metal material and which are carried by spiders or star wheels 96 keyed to shaft 84.

Device 20 also includes a pick-up head 98 which is connected to vacuum chamber 54 by a debris inlet 100, a conduit 102 and a flexible sleeve or rubber bellows 104. Impeller 82 may be rotated in the direction of arrow 106 (FIG. 1) with sufficient speed to create about 8.5 psi (of water) or other suitable partial vacuum for picking up pine seeds, needles and cones; this material enters debris inlet 100 in vacuum chamber 54 where it is decelerated as it progresses around the top of an air trap 108 provided in the bottom of vacuum chamber 54 by a plurality of rubber flaps 110 affixed to a shaft 112 rotatably mounted in a debris outlet 114 provided in the bottom of chamber 54. Centrifugal force holds the material to the outside of chamber 54; radially inwardly moving air tends to decelerate the material so that it is reduced in velocity before arriving over the air trap 108. Flaps 110 permit material the size of a pine cone to pass through air trap 108 without breaking the air seal formed between chambers 23 and 54 by the rotation of flaps 110 in the direction of arrow 116. Sticks longer than a pine cone and greater in diameter than one inch may bridge over air trap 108 holding flaps 110 partially open. This material may be removed by removing an access plate 118 affixed to front wall 24 of separator 18 by suitable fasteners 120. As material drops from air trap 108 onto screen 36, air entering air inlet 52 is directed under the front part of screen 36 to break up the bunches and separate the material for maximum seed retention; this area is intended to breakup and distribute the material only; adequate air to lift the light material may not be placed under the entire screen area because it may waste winged seed and partially winged seed.

Harvester 10 also includes a seed cleaner 122 for cleaning fine particles from separated seed. Cleaner 122 comprises a cylindrical drum 124 including a pair of end caps 126, 128 connected together by a plurality of tie rods or bars 130 and a pair of serpentine-shaped flights 132, 134 partially encompassed by a screen 136 in such a manner that an access opening 138 is left between two bars 130. This opening may be closed by a door 140 having a lower edge 142 swingably connected to one bar 130 by suitable hinges (not shown) and having an upper edge 144 releasably connected to another bar 130 by a pair of latches 146, 148 so that door 140 may be opened to remove separated, cleaned seeds from drum 124. Flights 132, 134 not only add to the structural stability of drum 124, but also serve to increase the capacity of drum 124 by holding seeds in the back of the drum.

Referring now to FIGS. 1, 3, 5, 9 and 10, harvester 10 also includes a seed-moving apparatus 150 for automatically moving separated seeds from separator 18 to seed cleaner 122. This apparatus includes an auger 152 and an elevator 154. Auger 152 is rotatably mounted in a trough 156 having a bottom wall 158, a pair of side walls 160, 162 (FIG. 10) and a pair of end walls 164, 166 positioned beneath separator screen 36 for receiving separated seeds from separator 18. End wall 166 is provided with an opening 168 (FIG. 9) through which auger 152 moves separated seeds to elevator 154.

Elevator 154 includes a housing 170 having an encompassing side wall 172 extending diagonally upwardly from auger 152 to seed cleaner 122 where a spout 174 (FIG. 5) communicates housing 170 with an opening 176 provided in end cap 128 on seed cleaner 122. Elevator 154 includes an endless chain 178 trained about a drive sprocket 180 and an idler sprocket 182. A plurality of rubber elevator flights 184 are connected to chain 178 by suitable clips 186 for lifting separated seeds to seed cleaner 122. Idler sprocket 180 is rotatably mounted on a bolt 188 having its ends affixed to housing 170 by suitable nuts 190 and washers 192 and is maintained in a central position on bolt 188 by a pair of spacers 194, 196. Auger 152 includes a shaft 198 having an end 200 (FIGS. 1 and 9) journaled in a bearing 202 affixed to a cover plate 203 by a plurality of bolts 204. Cover plate 203 is removably connected to housing 170 by a plurality of bolts 206 and facilitates access to drive sprocket 180, its associated components and auger 152.

Harvester 10 may also include a self-propelled vehicle 208 for moving harvester 10 over orchard floor 16. Vehicle 208 includes a chassis 210 upon which separator 18, seed moving device 20, and seed cleaner 122 are mounted. As best seen in FIGS. 1-5, chassis 210 includes a right rail 214 having a front end 216 and a rear end 218 (FIG. 5) and a left rail 220 having a front end 222 and a rear end 224. The lower frame 212 includes a front rail 226 affixed to rails 214, 220 adjacent their front ends 216, 222, respectively, and a rear rail 228 affixed to the rear ends 218, 224 of rails 214, 220, respectively. Suitable front axles, as shown at 230 in FIGS. 1 and 2 for the left front axle, may be affixed to the outboard ends of front rail 226 and the front ends 216, 222 of rails 214, 220, respectively, for rotatably supporting a left front wheel 232 and a right front wheel 234, respectively. Each wheel may be provided with a disc brake 236 (FIGS. 1 and 2) controlled by suitable calipers (not shown) affixed to a bracket 238 (FIG. 1) depending from lower frame 212. The front wheels 232, 234 may each be driven by a hydraulic motor 240 to which associated ones of the wheels 230, 232 may be affixed by bolts 242.

Chassis 210 also includes an upper frame 244 having a pair of rails 246, 248 positioned on lower frame 212 inboard of rails 214, 220 with their front ends 250 extending beyond front rail 226 and their rear ends 252 extending beyond rear rail 228. Upper frame 244 also includes a rear end rail 254 positioned between rails 246, 248 as shown in FIG. 3 and affixed to rear ends 252 thereof for supporting an axle bracket 256 to which a rear axle 258 may be pivotally connected by a pin 260 passing through the middle of axle 258 in a horizontal plane so that the rear wheels 262, 264 of vehicle 208 will float over rough terrain. Wheels 262, 264 may each be connected to rear axle 258 by a spindle 266 and a king pin 268. A steering arm 270 (FIG. 1) and a tie rod 272 may be connected to one of the spindles 266 for steering rear wheels 262, 264.

Figure 11:
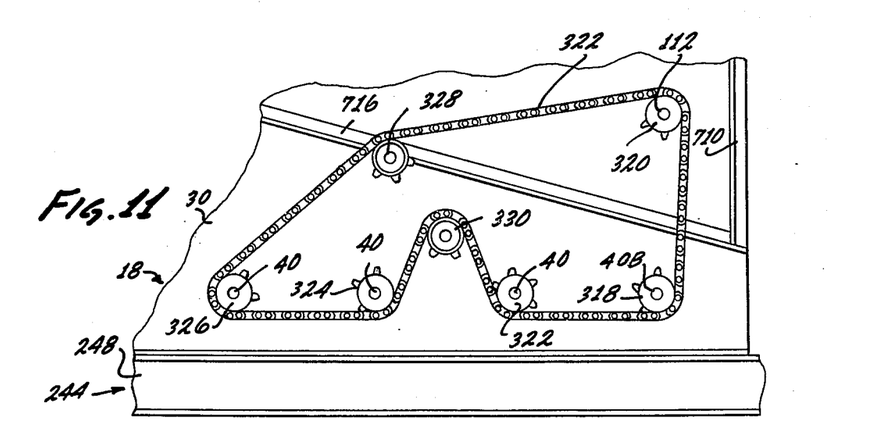
FIG. 11 is an enlarged, partial side-elevational view of a chain drive mechanism forming part of the harvester of FIG. 1.

Upper frame 244 includes a front end rail 274 having its long axis lying normal to the long axes of rails 246, 248 in such a position that rail 274 may be affixed to front ends 250 of rails 246, 248. Upper frame 244 also includes an intermediate rail 276 (FIG. 1) having its long axis lying normal to the long axes of rails 246, 248 to reinforce upper frame 244 so that it may be used to support an engine or prime mover 278 and an operator's cab 280. Engine 278 may be affixed to upper frame 244 by suitable front supports 282 and rear supports 284 and includes an output shaft 286 to which a pulley 288 (FIG. 2) may be affixed for driving fan 58 through a fan pulley 290, which is keyed to impeller shaft 84, and a fan belt 292, which is trained about pulleys 288, 290. An output pulley 294 (FIG. 3) is also keyed to impeller shaft 84 for supplying power to a jack shaft pulley 296 through a belt 298 for driving a jack shaft 300 having a first end 302 journaled in right side wall 30 of separator 18 by a first bearing 303 and a second end 304 journaled in the left wall 32 of separator 18 by a second bearing 306 (FIG. 3). A drive sprocket 308 is keyed to end 304 of shaft 300 for supplying power to a kicker shaft-main-drive sprocket 310 through a chain 312 (FIGS. 3 and 4) maintained in driving engagement with sprocket 310 by a pair of idlers 314, 316. Sprocket 310 is keyed to the left end 40A (FIG. 4) of the front kicker shaft 40 for transmitting power to a first kicker shaft sprocket 318 (FIG. 11) keyed to the right end 40B of the front kicker shaft 40. Air-trap shaft 112 is driven sprocket 318 through an air-trap sprocket 320 and a chain 322 which also drives second, third, and fourth kicker shaft sprockets 322, 324 and 326 and which may be maintained in proper driving relationship therewith by a pair of idlers 328, 330 rotatably mounted on side wall 30 of separator 18.

Referring now FIGS. 1, 3, 4 and 11, the fourth kicker shaft sprocket 326 transmits power through the rear kicker shaft 40 to a fifth shaft sprocket 332 (FIG. 4) carried by the left end 40C of the rear kicker shaft 40; sprocket 332, in turn, transmits power to a debris-impeller sprocket 334, which is keyed to impeller shaft 48, and a chain 336.

The operation of motor output shaft 286 may be controlled by a clutch mechanism 336 (FIGS. 1 and 2) which may be operated by a clutch lever 338 having its lower end 340 connected to a rocker shaft 342 rotatably mounted in clutch 336.

Engine 278 also has a front output shaft 344 (FIG. 3) which drives a pulley 346 about which a belt 348 is trained for driving a hydraulic-pump pulley 350 (FIG. 4) carried by the input shaft 352 of a hydraulic pump 354 affixed to upper frame 244 by a bolt 356. Hydraulic fluid may be supplied to pump 354 through a pump inlet pipe 358 connected to a hydraulic reservoir 360 by a suitable fitting 362. Hydraulic reservoir 360 may be filled with hydraulic fluid through a filler neck 364 (FIG. 2) which may be closed with a cap 366 and may be mounted on top of a fuel tank 367 (FIGS. 3 and 4), which is carried by lower frame 212 and which may be filled with a suitable fuel for engine 278 through a filler 368 (FIG. 4).

Hydraulic pump 354 may be used to supply hydraulic fluid under pressure (through a system to be hereinafter described) to a hydraulic motor 370 (FIG. 10) affixed to rear rail 228 on lower frame 212 for supplying power to drive cleaner drum 124 and auger 152 through an output shaft 372 to which an hydraulic-motor output sprocket 374 is affixed. An auger-cleaner drive chain 376 (FIGS. 1, 3, 5 and 10) is trained about sprocket 374 and about an auger-input sprocket 378 (FIGS. 1 and 10) affixed to the end 380 of auger shaft 198 which is journaled in a bearing 382 and affixed to end wall 164 on trough 156. Chain 376 is also trained about a cleaner-input sprocket 384 (FIGS. 3, 5 and 10) affixed to the end 386 of a cleaner-drum shaft 388 which is journaled in a bearing 390 carried by a bracket 392 affixed to lower frame 212 for rotatably supporting cleaner drum 124. Chain 376 is also trained about an upper idler 394, which is affixed to lower frame 212 by a bracket 396 (FIGS. 3 and 10), and a lower idler 398 (FIG. 10), which is affixed to rear rail 228 on lower frame 212.

Figure 4:
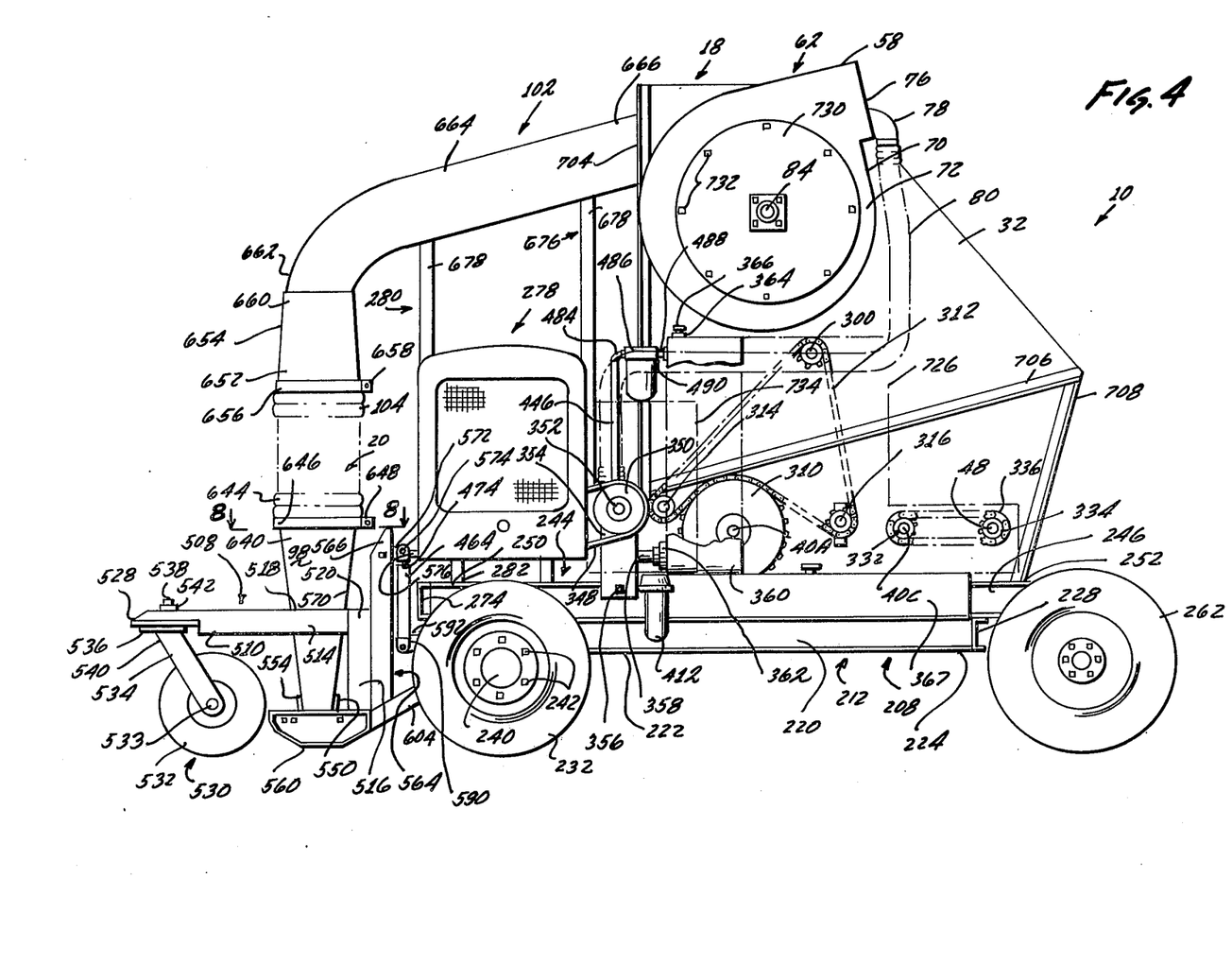
FIG. 4 is a left side-elevational view.
Figure 5:
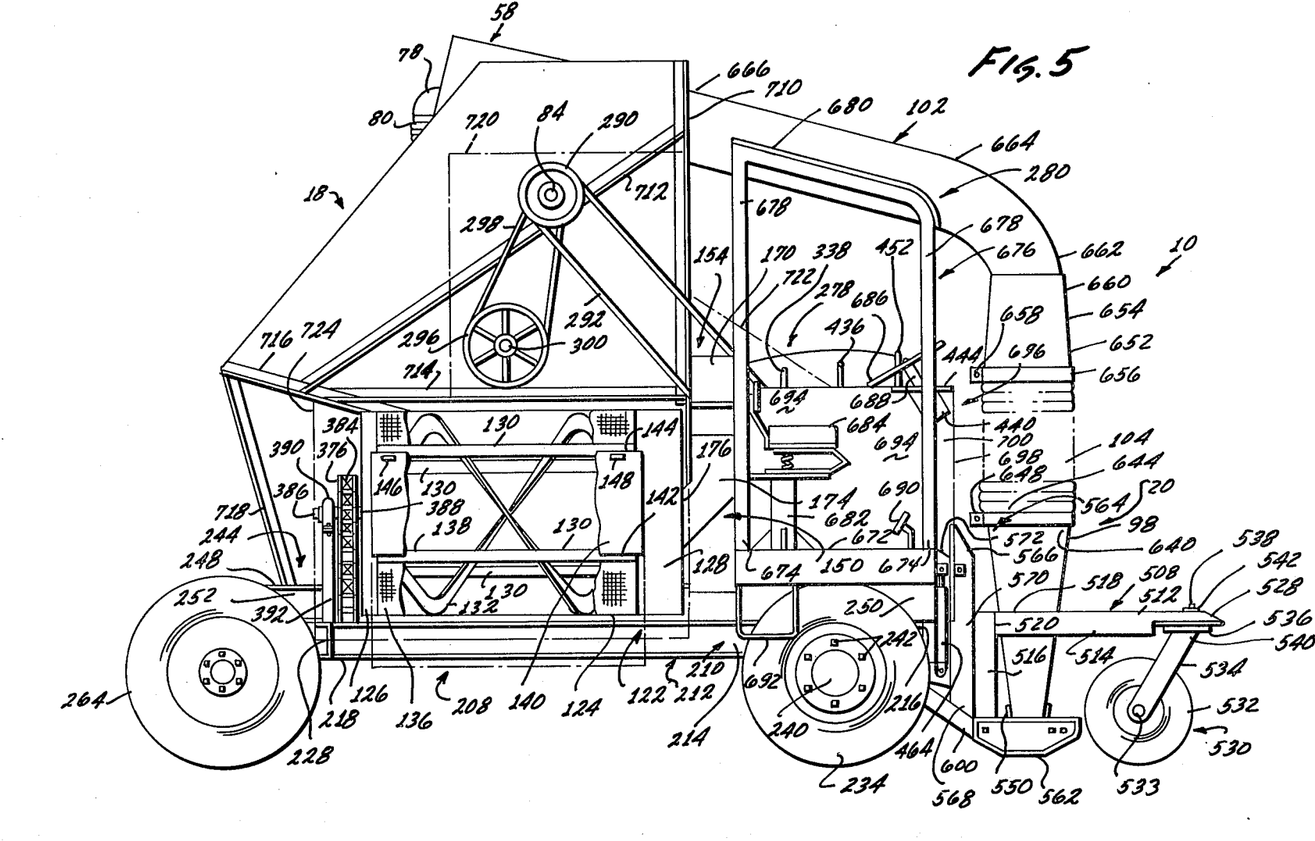
FIG. 5 is a right side-elevational view, with parts broken away to show internal construction.
Figure 12:
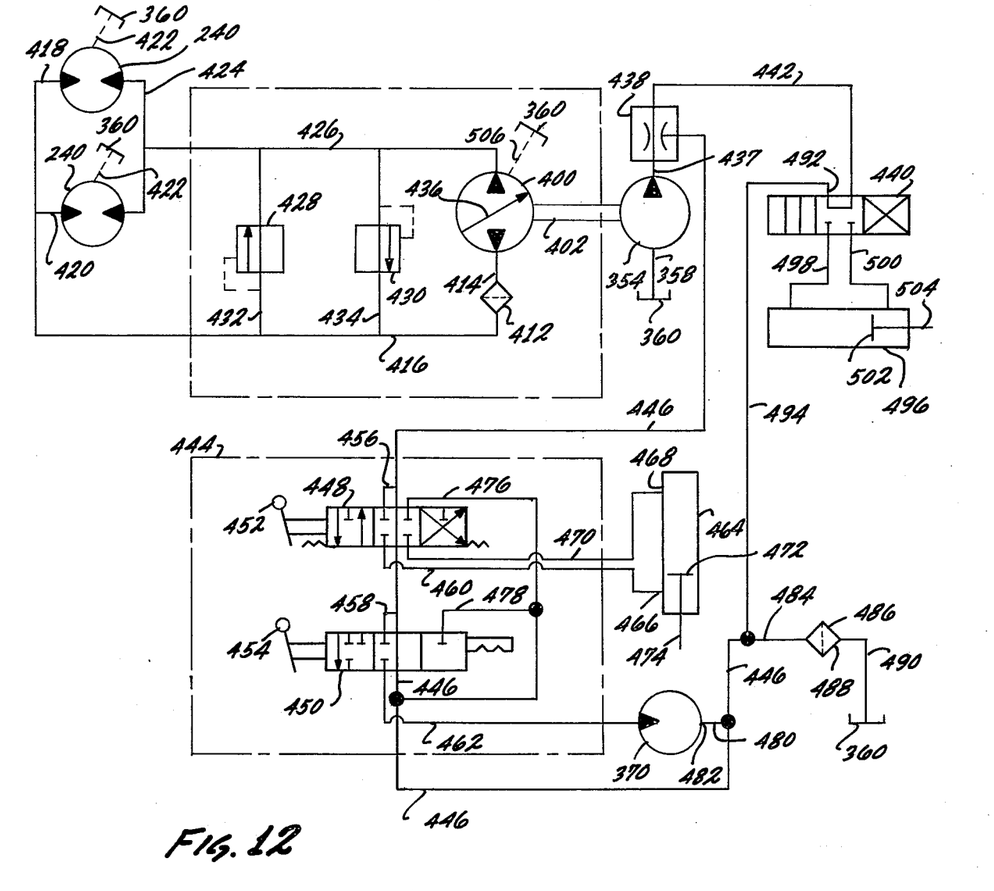
FIG. 12 is a schematic view of a hydraulic system used in the device of FIG. 1.

Referring now to FIGS. 3, 4 and 12, pump 354 has a variable-volume, hydraulic pump 400 connected to it by a splined shaft, indicated schematically at 402 in FIG. 12, so that pump 354 will also drive pump 400 which is carried by pump 354 in piggy-back fashion. The front end 404 of pump 400 (FIG. 3) may be supported by a bracket 406 having an upper end 408 affixed to front end 404 of pump 400 and a lower end 410 affixed to front rail 274 on upper frame 244. Pump 400 supplies hydraulic fluid to wheel motors 240 and is connected in a hydraulic circuit which includes a high-pressure hydraulic filter 412 (FIGS. 4 and 12) affixed to the left rail 220 on lower frame 212 and connected to pump 400 by a pipe 414 (FIGS. 3 and 12).

Referring now to FIG. 12, filter 412 is connected to wheel motors 240 by a main conduit 416 and branch conduits 418, 420. Each wheel motor 240 is connected to reservoir 360 by suitable conduits, indicated schematically at 422 and to pump 400 by a branch conduit 424 and a main conduit 426. A pair of pressure release valves 428, 430 are connected across conduits 416, 426 by branch conduits 432, 434 for protecting wheel motors 240. Pump 400 is an over-center pump allowing control of wheel motors 240 with a single lever 436 (FIGS. 5 and 12) having forward and reverse positions.

Pump 354 is connected by a conduit 437 to a flow divider 438 which supplies hydraulic fluid under pressure to a power steering motor 440 through a conduit 442. Secondary flow from flow divider 438 is conducted to a hydraulic-control-valve console 444 through a conduit 446. A header-lift valve 448 and an auger-cleaner control valve 450 are mounted on console 444 for controlling the position of vacuum head 98 (FIG. 5) and the operation of auger-cleaner motor 370 (FIG. 10), respectively. Valves 448, 450 include control levers 452, 454, respectively, which may be mounted on console 444 in cab 280, as shown in FIG. 2. Valves 448, 450 are connected to conduit 446 by branch conduits 456, 458, respectively, for receiving incoming fluid which may leave valves 448, 450 through conduits 460, 462, respectively to supply a hydraulic cylinder 464 (FIGS. 4, 8 and 12), which may be used to raise and lower vacuum head 98, and to motor 370, respectively. Hydraulic cylinder 464 includes a first port 466 to which branch conduit 460 is connected; a second port 468, which is connected to valve 448 by a conduit 470; a piston 472, which may be moved between ports 466, 468 by fluid under pressure from valve 448, and a piston rod 474, which may be connected to vacuum head 98 by a mechanical system to be hereinafter described. Branch conduits 476, 478 connect valves 448, 450, respectively, back into conduit 446 downstream of valves 448, 450 and a branch conduit 480 connects the downstream side 482 of motor 370 into conduit 446. The downstream end 484 of conduit 446 is connected to a return-line, hydraulic filter 486 (shown in elevation in FIG. 4) having its outlet port 488 connected to hydraulic reservoir 360 by a conduit 490.

Power steering motor 440 includes an outlet port 492 which is connected to conduit 446 by a branch conduit 494 for returning fluid to reservoir 360 through filter 486. Steering motor 440 is connected to a steering cylinder 496 by conduits 498, 500 for controlling the operation of a piston 502 to which a piston rod 504 is affixed. Piston rod 504 may be connected to tie rod 272 (FIG. 1) for steering rear wheels 262, 264.

Pump 400 may be connected to reservoir 360 by suitable conduits, indicated schematically at 506 in FIG. 12.

Referring now to FIGS. 1, 2, 4, 5 and 8, vehicle 208 also includes a vacuum-head carrier 508 comprising a pair of L-shaped frames 510, 512 each having a long leg 514, the major axis of which lies in a horizontal plane, and a short leg 516, the major axis of which lies in a vertical plane. The rear end 518 of leg 514 is connected to the upper end 520 of leg 516 and frames 510, 512 are maintained in spaced-apart relationship by a bar 522 having its ends 524, 526 affixed to associated ones of the upper ends 520 of legs 516. The front end 528 of each leg 514 is supported by a castor assembly 530 comprising a wheel 532 rotatably mounted by an axle 533 in a yoke 534 having a plate 536 and a spindle 538 provided at its upper end 540 for pivotally connecting it to leg 514 by a suitable fastener 542 which engages spindle 538 on top of leg 514.

The lower ends 544 of legs 516 are connected to a bar 546, which extends across the lower edge of vacuum 546, by suitable bolts, like the ones shown at 548 in FIG. 1. A first rubber flap 550 may be positioned between bar 546 and the lower end 552 of vacuum head 98 to control the clearance between vacuum head 98 and orchard floor 16. Flap 550 may be provided with suitable elongated openings to accommodate bolts 548 so that flap 550 may be adjusted with respect to orchard floor 16 by loosening bolts 548. A second rubber flap 554 may be positioned between the front edge of vacuum head 98 and a U-shaped bumper plate 556 affixed to vacuum head 98 by suitable bolts, like the ones shown at 558 in FIG. 1. The second flap 554 may also be provided with elongated openings (not shown) through which bolts 558 pass so that flap 554 may also be adjusted by loosening bolts 558. A pair of skid shoes 560, 562 may be affixed across the ends of bar 546, bumper 556 and the lower end 552 of vacuum head 98 for coaction with flap 550, 554 to increase vacuum-head suction.

Vacuum-head carrier 508 also includes an upright hanger bracket 564 having an upper end 566, a lower end 568 and an intermediate portion 570. The lower end 568 is affixed to bar 546 intermediate its ends and the intermediate portion 570 is affixed to bar 522 intermediate its ends. Piston rod 474 on hydraulic cylinder 464 may then be connected to upper end 566 by a link 572 and a bolt 574 which also connects the front end 576 of an adjusting device 578 to upper end 566 for adjusting the tilt of vacuum head 98. The rear end 580 of adjusting device 578 is connected to a cross bar 582, which is affixed to rails 214, 248 on chassis 210, by a bolt 584 supporting end 580 between a pair of brackets 586, 588 carried by cross bar 582. The lower end 590 of hydraulic cylinder 464 may be connected to chassis 210 by a bracket 592 (FIG. 8) having its rear end 594 connected to rail 226 on lower frame 212 and an intermediate portion 596 connected to the underside of rail 274 on frame 244 by a plate 598.

The lower end 592 of vacuum head 98 may be stabilized and its movement may be controlled by a plurality of stabilizer bars 600, 602 and 604, (FIG. 8) which connect the lower end 552 of vacuum head 98 to chassis 210. Stabilizer bar 600 has its rear end 606 connected to lower frame 212 by a bolt 608 having one end connected to rail 214 and its other end connected to a bracket 610 affixed to rail 226 ad its front end 612 connected to the lower end 552 of vacuum head 98 by a bolt 614 engaging a bracket 616, which is affixed to bar 546, and the lower end of short leg 516 on frame 512. Stabilizer bar 602 has its rear end 618 connected to lower frame 212 by a bolt 620 passing through a pair of brackets 622, 624 affixed to rail 226 and its front end 626 connected to the lower end 552 of vacuum head 98 by a bolt 628 passing through the short leg 516 of frame 510 and a bracket 630 affixed to bar 546. Stabilizer bar 604 has its rear end 632 connected to lower frame 212 by a bolt 634 having one end connected to rail 220 and another end connected to a bracket 636 affixed to rail 226 and its front end 638 connected to bolt 628. The ends of stabilizer bars 600, 602 and 604 are pivotally connected to their associated parts so that they will not interfere with the action of hydraulic cylinder 464 in raising and lowering vacuum head 98 or with adjusting device 578 in adjusting the tilt of vacuum head 98.

Vacuum head 98 includes an upper end 640 defining a circular opening 642 to which the lower end 644 of flexible sleeve 104 may be attached by a clamp 646 secured to sleeve 104 by a bolt 648. The upper end 650 of sleeve 104 is connected to the lower end 652 of a transition member 654 by a clamp 656 and a bolt 658. The lower end 652 of transition member 654 is substantially cylindrical for engaging cylindrical sleeve 104; however, the upper end 660 of transition member 654 is substantially rectangular in shape where it engages the lower end 662 of the upper portion 664 of conduit 102 which has a substantially rectangular cross section. The upper end 666 of the upper portion 664 of conduit 102 is provided with a flange 668 (FIGS. 1 and 2) which may be connected to separator 18 by a plurality of bolts 670.

Referring now to FIGS. 2, 3, 4 and 5, cab 280 includes a floor 672 to which the lower end 674 of a cab frame 676 is affixed. Frame 676 includes a plurality of upright members 678 across the tops of which a roof 680 is affixed. A post 682 is mounted on floor 672 (FIG. 5) for supporting a seat 684 adjacent a steering wheel 686 connected to power steering motor 440 by a shaft 688. A brake pedal 690 is provided in cab 280 for controlling brakes 236 and a step 692 is affixed to floor 672 to assist an operator in climbing into cab 280. The left, lower portion of cab 280 may be enclosed with a plate 694 and the front lower portion of cab 280 may be boxed in with a plate 696 having a front panel 698 and a pair of side panels, like the ones shown at 700 in FIG. 5. The rear upper portion of cab 280 may be provided with a transparent window 702 for protecting an operator of harvester 10 from dust and debris exiting from the rear of harvester 10.

The metal walls forming the housing for separator 18 may be reinforced by a first set of reinforcing members 704, 706 and 708 provided on the left side of harvester 10 and a second set of reinforcing members 710, 712, 714, 716 and 718 provided on the right side of harvester 10.

Screen-type metal cages may be used to cover exposed, moving parts on harvester 10 for the safety of persons working around harvester 10 and, additionally, to protect the moving parts from tree limbs and other objects. For example, fan pulley 290 and jack shaft pulley 296 may be protected by a suitable cage, indicated schematically at 720 in FIGS. 3 and 5; belt 292 may be protected by a suitable cage, as shown schematically at 722 in FIG. 5; the rear end of seed cleaner 122 may be protected by a suitable cage, as indicated schematically at 724 in FIGS. 3 and 5; the exposed chains and sprockets on the left side of harvester 10 may be protected by a suitable cage, as indicated schematically at 726 in FIGS. 3 and 4 and the moving parts in engine 278 may be protected by a suitable screen, as indicated schematically at 728 in FIG. 3.

As best seen in FIG. 4, access may be had to fan housing 62 by removing an access cover 730 secured to side wall 72 by a plurality of bolts 732.

Pump pulley 350 and belt 348 may be protected by a suitable screen, as indicated schematically at 734 in FIG. 4.

As best seen in FIG. 2, engine 278 may include a housing 736 having a front end 737 provided with a grill 738 and a right side 739 provided with a cover plate 740.

Figure 7:
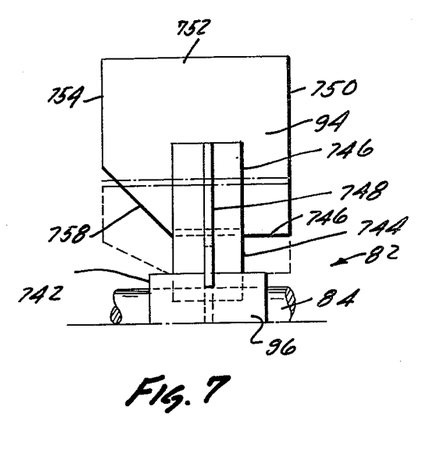
FIG. 7 is a cross-sectional view taken along line 7—7 of FIG. 1.
Figures 8, 9:
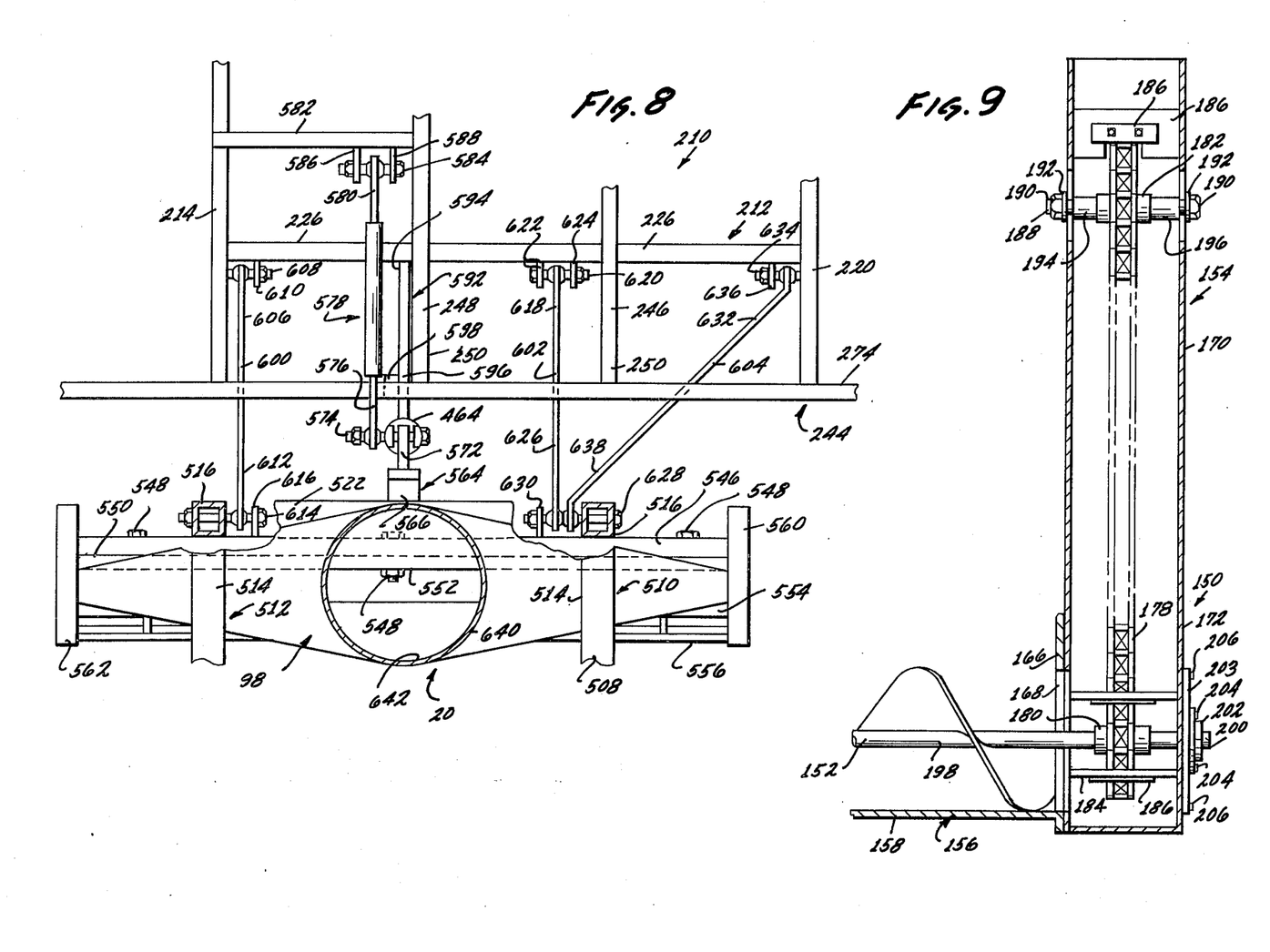
FIG. 8 is a partial, enlarged cross-sectional view taken along line 8—8 of FIG. 4.
FIG. 9 is an enlarged, partial cross-sectional view of an auger and elevator forming part of the harvster of FIG. 1.
Figure 10:
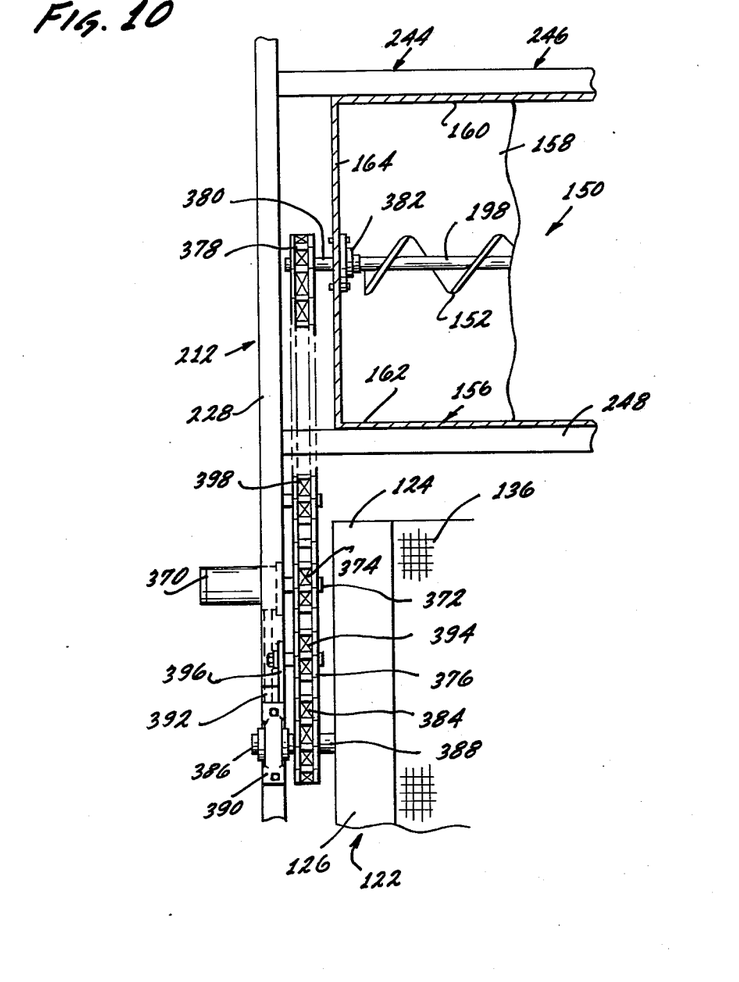
FIG. 10 is an enlarged, partial plan view, with parts broken away to show internal construction, of an auger and cleaner forming part of the harvester shown in FIG. 1.

Referring now to FIGS. 1 and 7, spider 96 includes a hub 742 from which a plurality of arms 744 radiate. Each arm 744 includes a face plate 746, to which one of the fan blades 94 is affixed, as is a reinforcing rib 748. Each fan blade includes a front edge 750, a top edge 752, a rear edge 754, a bottom edge 756 and a fifth edge 758, which may be formed by cutting away one corner formed by bottom edge 756 and rear edge 754 for increasing fan suction. Blades 94 may be stamped or otherwise fashioned from suitable steel sheets and spider 96 may be cast from a suitable metal as a single unit. Alternatively, hub 742 and reinforcing ribs 748 may be cast as one unit and face plate 746 may then be attached to reinforcing ribs 748.

A number of different parameters for the individual components of seed harvester 10 will manifest themselves to those skilled in the art. For example, and by way of illustration, but not of limitation, harvester 10 may have an overall height of 9 feet 9 inches, a width of 8 feet, a length of 14 feet and may weigh 5930 pounds.

Engine 278 may be a 240 CID gasoline engine developing 86 HP at 2800 RPM and may be complete with a starter, a generator, and a main drive clutch.

The front tires may be 26×12.00-12 Terra-type tires for maximum flotation and traction on any type of soil. The rear tires may be 5.50×16 automobile or industrial tires.

The lower end or opening 552 of pick-up head 98 may be 60 inches wide along its major axis and may define a 3 inch opening with a 0.5 psi (of water) vacuum to facilitate picking up seeds, pine needles and cones. Head 98 has a floating action for even pick-up for rough terrain and is hydraulically adjustable for easy setting of the pick-up height. This height should be approximately 1½ inches to 2 inches above the ground. On extremely rough ground, flaps 550, 554 may be extended down to approximately 2 to 2½ inches below the pick-up head which may then be raised correspondingly. In orchards which have been properly mowed and well prepared, flaps 550, 554 may be as little as ½ inch below opening 552.

Separator screen 36 may be of the wave type defining perforated troughs above which four rotating shafts with steel and rubber fingers rotate for separating large material from seed and fine particles and for moving the large material along to a plate 760 positioned beneath impeller 46 between debris outlet 44 and auger end wall 164 the upper edge 762 (FIG. 1) of which supports the rear or trailing edge of screen 36.

The drum 124 for seed cleaner 122 may have a 30 inch diameter and a 40 inch length; screen 136 may have a ⅛ inch mesh and drum 124 may be hydraulically controlled; control valve 450 (FIG. 12).

Fan impeller or blower 82 may have a 36 inch diameter and is designed for vacuum operation with an exhaust velocity of approximately 200 mph at air scoop 78.

Hydraulic oil reservoir 360 may have a 25 gallon capacity for operating the hydraulic wheel motors, power steering, motor 370 and the hydraulic cylinders.

Seed harvester 10 may be operated at a speed suitable to give optimum pick up of seed bearing material from the harvest floor.

A clutch lever 338 operates a clutch 336 on the prime mover 278 to control the clutch output shaft 286 to drive the impeller fan 82, which clutch shaft also rotates the air trap 108, kicker shafts 40 and debris impeller 46.

A control lever 454 is actuated to cause the hydraulic motor 370 to rotate the conveyor auger 152 to rotate the elevator 154 and the cleaner drum 124.

The rotating vacuum trap 108 permits the seed to drop out of chamber 54, due to centrifugal action of the air stream in which the seed and debris are entrained. The seed and debris fall from the chamber 54 around the outer periphery thereof and slide downwardly, with only the air being drawn centrally into the fan through opening 60. The seed and debris are allowed to move downward, with the vacuum being neutralized so that the seed will drop onto wave screen 38, pass therethrough and onto auger 150 into elevator 154, which directs the seed into compartment 122.

The harvester 10 may then be driven along orchard floor 16 picking up seeds and debris 14 which enter open end 552 of pick-up head 98 and move upwardly along the top side of upper portion 664 of conduit 102 and into the top of vacuum chamber 54 where the incoming material is decelerated as it progresses around the top of the air trap 108. Centrifugal force holds the material to the outside of vacuum chamber 54 while the radially inwardly moving air tends to decelerate material so that it is reduced in velocity before arriving over the air trap 108. The material then drops through air trap 108 while flaps 110 maintain an effective seal between the ambient air pressure on the downstream side 764 (FIG. 1) of air trap 108 and the negative head in vacuum chamber 54. As the incoming material is dropped from air trap 108 onto screen 36, some of the air exhausted by fan 58 is picked up by the air scoop 78 and is conveyed to air inlet 52 through conduit 80. Air entering inlet 52 is directed under the front part of the screen 36 to break up bunched incoming material and separate the material for maximum seed retention in separator 18. The air under the front part of the screen is intended to break up and distribute the material only. Adequate air to lift the light material may not be placed under the entire screen area because this would displace winged seed and partially winged seed.

Rubber kicker fingers 50, which are rotated counter-clockwise in the direction of arrow 766 and is viewed in FIG. 1, strike screen 36 causing it to vibrate encouraging seeds 12 to become separated from debris 14 and pass through screen 36 into auger trough 156 where auger 152 moves the separated seed through opening 168 (FIGS. 9) in auger-trough end wall 166 and into elevator housing 170 where elevator flights 184 moves the separated seeds into cleaner drum 124.

Rotation of kicker shafts 40 in the direction of arrow 766 also causes the steel kicker fingers 42 and the rubber kicker fingers 50 to move separated debris onto plate 760 where impeller 46 is rotating in the direction of arrow 768 to move the separated debris out debris outlet 44.

Seeds entering drum 124 will be mixed with sand and other fine material which passes through screen 136 during rotation thereof by hydraulic motor 370. Screen 136 may have a ⅛ inch mesh for most seeds. If, on the other hand, seed harvester 10 is used to harvest seeds from Virginia pine or the like, it will be necessary to decrease the size of screen 136. Fine material will continue to be rejected by screen 136 even after seeds and debris are no longer being picked up by pick-up head 98. Thus, control lever 454 should be actuated to energize drum 124, auger 152 and elevator 154 before clutch lever 338 is manipulated to engage clutch 336 for energizing fan 58 and the cleaner, auger and elevator should be allowed to run for some time after clutch 336 has been disengaged.

It has been found that the embodiment of seed harvester 10 hereinshown and described in detail is capable of picking up 95 to 98 percent of the seeds from a level ground. Ruts, deep indentations and poorly prepared ground will, of course, reduce this percentage of seed pick-up.

The inside of vacuum chamber 54 should be scoured before use and care should be taken that the first operation is after all material is very dry. When seed harvester 10 is to be left idle for a number of days, access plate 118 should be removed from vacuum chamber 54 and the entire bottom and back slide area should be sprayed with a molycoat or a silicone-type dry lubricant.

While the particular seed harvester herein shown and described in detail is fully capable of attaining the objects and providing the advantages hereinbefore stated, it is to be understood that it is merely illustrative of the presently-preferred embodiment of the invention and that no limitations are intended to the details or design herein shown other than as defined in the appended claims, which form a part of this disclosure.

Wherever the term "means" is employed in these claims, this term is to be interpreted as defining the corresponding structure illustrated and described in the specification or the equivalent of the same.

What is claimed is:

1. Apparatus for harvesting seeds mixed with debris on an orchard floor, comprising:
    A. a separator;
    B. means for moving said seeds and debris from said orchard floor to said separator; and
    C. means mounted in said separator for separating said debris from said seeds, said separating means including a screen, said moving means comprising:
        a. a vacuum chamber having an outlet communicating with said separator and an inlet;
        b. a pick-up head carried by said apparatus closely adjacent said orchard floor;
        c. a conduit connecting said pick-up head to said vacuum chamber inlet;
        d. a flexible seal rotatably mounted in said vacuum chamber outlet for maintaining an air seal while moving said seeds and debris through said vacuum chamber outlet to said screen in said separator; and
        e. a fan rotatably mounted in a housing on said apparatus in fluid communication with said vacuum chamber for creating at least a partial vacuum in said vacuum chamber; said fan housing including an air outlet and said apparatus including a conduit connecting said air outlet to said separator for discharging air under said screen to lift said debris above said screen.

2. An apparatus as stated in claim 1 including:
    a seed outlet mounted on said apparatus beneath said screen;
    a seed cleaner mounted on said apparatus for cleaning seeds separated from debris;

an auger mounted on said apparatus beneath said screen in communication with said seed outlet for collecting seeds dropping through said screen and moving them to said seed outlet; and an elevator communicating said seed outlet with said seed cleaner for moving seeds from said auger to said seed cleaner.

3. A seed harvester for gathering seeds and debris from an orchard floor and separating said seeds from said debris, said harvester comprising:

a vehicle including motor means for propelling said vehicle over said orchard floor;

a pick-up head mounted on said vehicle closely adjacent said orchard floor for picking up said seeds and debris;

a vacuum chamber mounted on said vehicle, said vacuum chamber having a seed-debris inlet and a seed-debris outlet;

a vacuum conduit connecting said pick-up head to said seed-debris inlet on said vacuum chamber;

a fan mounted in a housing on said vehicle, said fan housing having a fan-air inlet connected to said vacuum chamber for creating at least a partial vacuum in said vacuum chamber for moving said seeds and debris from said orchard floor to said vacuum chamber through said pick-up head, said vacuum conduit and said seed-debris inlet, said fan housing including a fan-air outlet;

a separator chamber mounted on said vehicle in communication with said vacuum-chamber, seed-debris outlet for receiving seeds and debris from said vacuum chamber, said separator chamber being provided with an open bottom and a debris outlet;

a separator screen closing said open bottom in said separator chamber for holding said debris while permitting said seeds to pass through said open bottom;

means mounted on said vehicle in association with said separator screen for moving said debris away from said separator screen, whereby said seeds are freed to move through said separator screen without being obstructed by debris lying on said separator screen;

a cleaner mounted on said vehicle for cleaning fine particles from seeds which have passed through said separator screen, said cleaner having a cleaner screen of a mesh which will retain said seeds while permitting said fine particles to pass through said cleaner screen; and means connecting said open bottom of said separator chamber beneath said separator screen to said cleaner for moving separated seeds from said separator chamber to said cleaner, said means for moving debris away from said separator screen comprising:

a separator-air inlet mounted in said separator chamber beneath said separator screen;

an air conduit connecting said separator-air inlet to said fan-air outlet for conducting air under pressure from said fan housing to the underside of said separator screen for lifting said held debris above said separator screen; and a plurality of fingers rotatably mounted above said separator screen for sweeping said held debris towards said debris outlet.

4. A seed harvester as stated in claim 3 including a resilient impeller rotatably mounted in said separator chamber adjacent said debris outlet for discharging said swept debris from said separator chamber through said debris outlet.

5. A seed harvester as stated in claim 3 wherein said fingers include rigid fingers for moving large debris and resilient fingers for moving light debris, said resilient fingers being of sufficient length to strike said separator screen and vibrate it.

6. A seed harvester as stated in claim 3 wherein said motor means for propelling said vehicle over said orchard floor comprises a first motor, wherein said vehicle includes a second motor independent of said first motor for driving said fan and wherein said vehicle includes a third motor separate from said first and second motors for operating said debris-moving means, said cleaner and said means for moving separated seeds from said separator chamber to said cleaner.

7. A seed harvester as stated in claim 6 wherein said first and third motors are hydraulic motors and wherein said second motor is an internal combustion engine.

8. Apparatus for separating seeds from pine cones, pine needles and the like comprising:

a separator having an open bottom;

a screen mounted in said open bottom of said separator for receiving said seeds, pine cones, pine needles and the like;

means for vibrating said screen so that said seeds will pass through said screen, said screen being a fine mesh screen having a plurality of troughs, said screen-vibrating means including a plurality of flexible fingers rotatably mounted along the long axis of each trough for cyclically striking said screen; and a plurality of rigid fingers positioned adjacent said flexible fingers for sweeping said separated debris out of said troughs.

9. Apparatus for harvesting seeds mixed with debris on an orchard floor, comprising:

A. a separator;

B. means for moving said seeds and debris from said orchard floor to said separator;

C. means mounted in said separator for separating said debris from said seeds, said separating means including:

a. a screen mounted in the bottom of said separator for receiving said seeds and debris, said screen being a fine mesh screen having a plurality of troughs; and b. means for vibrating said screen so that said seeds will pass through said screen; said screen-vibrating means including a plurality of flexible fingers rotatably mounted along the long axis of each trough for cyclically striking said screen; and D. a plurality of rigid fingers positioned adjacent said flexible fingers for sweeping said separated debris out of said troughs.

* * * * *